Aug. 7, 1956
J. G. McCAVEY ET AL
2,757,936
VEHICLE WITH DEMOUNTABLE SUSPENSION
SYSTEM AND ADJUSTABLE BED
Filed Nov. 17, 1954
2 Sheets-Sheet 1
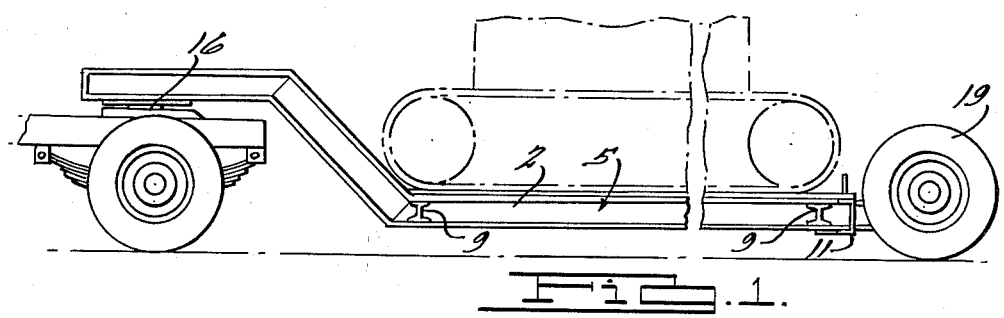
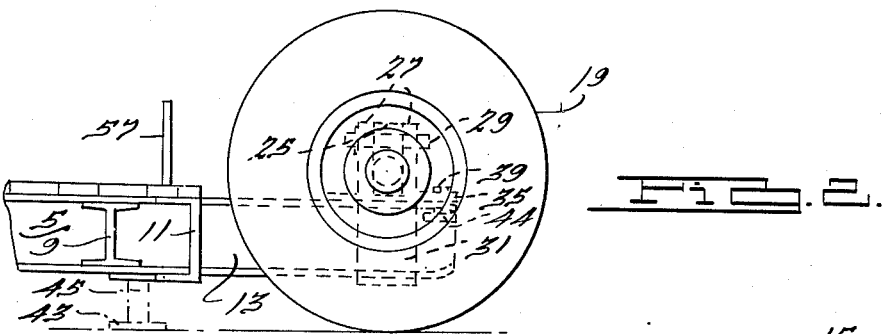
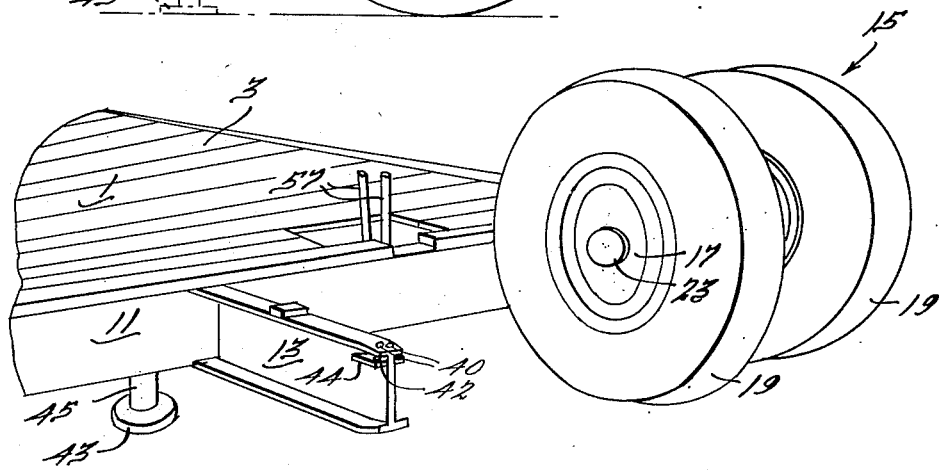
INVENTORS.
James G. McCavey
Charles W. Maddix
BY
Harness, Dickey & Pierce.
ATTORNEYS Aug. 7, 1956  J. G. McCAVEY ET AL  2,757,936
VEHICLE WITH DEMOUNTABLE SUSPENSION
SYSTEM AND ADJUSTABLE BED
Filed Nov. 17, 1954  2 Sheets-Sheet 2
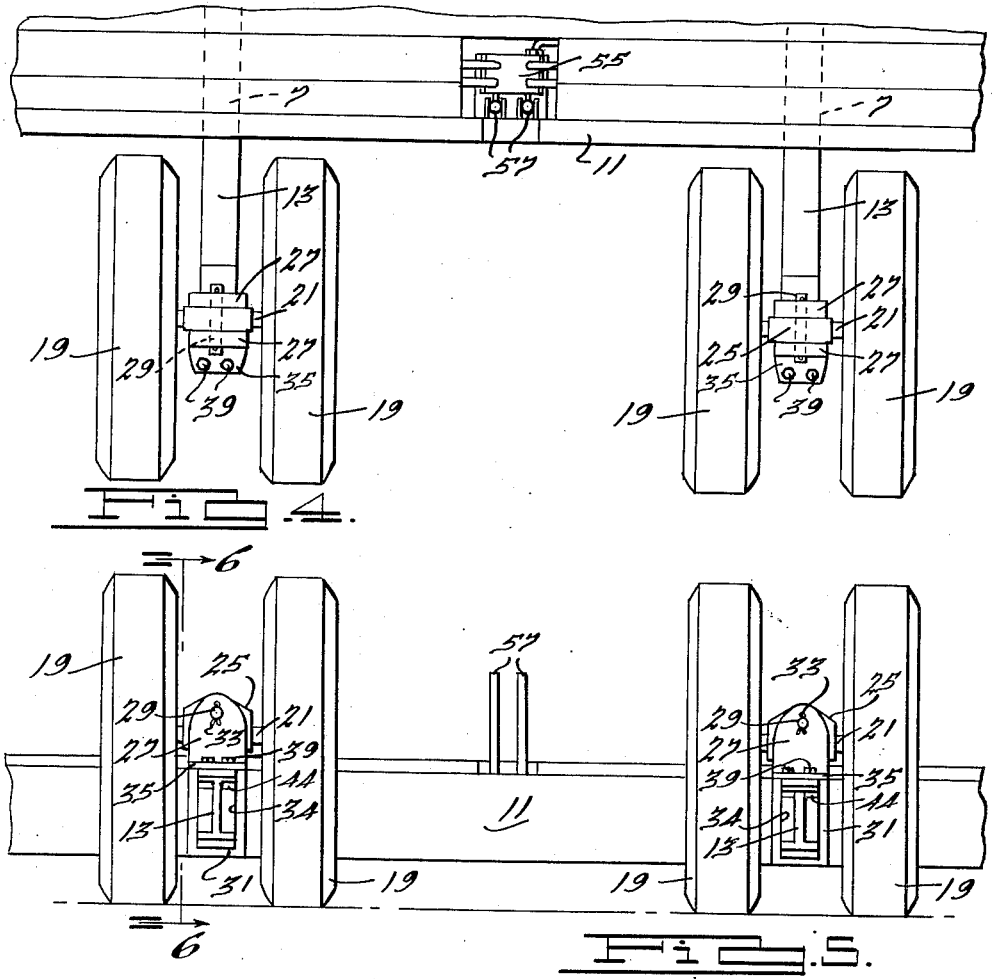
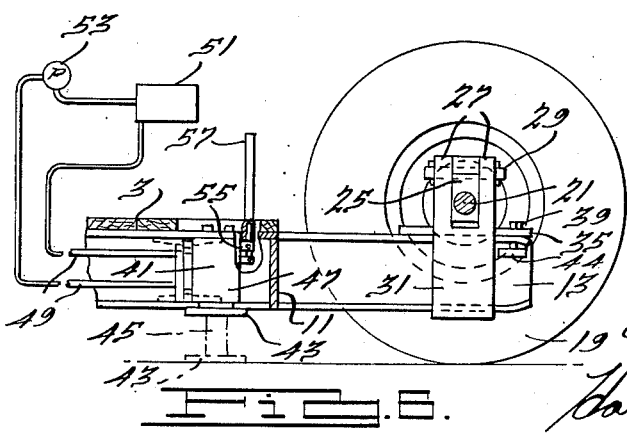
INVENTORS.
James G. McCavey
Charles W. Maddix.
BY
Harness, Dickey & Pierce
ATTORNEYS

United States Patent Office 2,757,936
Patented Aug. 7, 1956

2,757,936

VEHICLE WITH DEMOUNTABLE SUSPENSION SYSTEM AND ADJUSTABLE BED

James G. McCavey and Charles W. Maddix, Royal Oak, Mich.

Application November 17, 1954, Serial No. 469,442

4 Claims. (Cl. 280—44)

This invention relates to trailers, semi-trailers and the like, particularly for use on highways for carrying heavy and bulky loads.

The principal object of the invention is to provide a simple, inexpensive, rugged trailer construction of the type having a wide floor and wheels mounted behind the trailer with improved means which will permit large loads such as vehicular equipment to be moved or driven onto the trailer from its rear, thus positioning a load lengthwise along the trailer.

Many heavy and bulky loads such as earth moving machinery and vehicular and other equipment which are transported on a trailer must be oriented lengthwise if width restrictions imposed by highway authorities are not to be violated. To stay within such width restrictions while still permitting the carrying of heavy loads without overloading individual wheels and tires, it is a practical necessity to arrange the wheels across the back of wide-bed trailers and semi-trailers designed to carry wide, bulky or heavy loads. When the wheels are arranged across the back, however, difficulty is encountered in loading under many conditions. When the load is moved or driven onto the trailer from the side, space limitations often do not permit turning the load to a lengthwise position along the trailer without great difficulty. Thus the load may overlap the sides of the trailer, making its transportation extremely hazardous and cumbersome. It is therefore almost imperative to load such equipment from the end of the trailer. This procedure presents the problem of removing the rear wheels which would otherwise obstruct the passage of the load.

It is therefore a further object of my invention to provide a trailer, the rear wheels of which may be conveniently removed and installed.

It is a further object of my invention to provide a trailer having means for lowering the trailer bed to the ground for the more convenient loading of heavy objects as by driving heavy vehicular equipment directly from the ground onto the trailer, or by sliding machinery on rollers on the ground directly onto the trailer bed.

It is also an object of my invention to provide a trailer of the above description which is of rugged, inexpensive, and durable construction.

Further objects and advantages of this invention will become apparent from the following detailed description when taken in conjunction with the accompanying drawings, in which:

Figure 1 is a side elevational view of a semi-trailer embodying the present invention, fragmentarily showing a truck supporting the front end of the trailer and coupled thereto, and also diagrammatically showing the location of a loading vehicle on the trailer.

Fig. 2 is a fragmentary side elevational view of the semi-trailer shown in Fig. 1 illustrating the rear wheel and axle support assembly.

Fig. 3 is a perspective view of that part of the semi-trailer shown in Fig. 2, with one dual wheel and axle support assembly removed.

Fig. 4 is a plan view of the semi-trailer as shown in Fig. 2.

Fig. 5 is a rear elevational view of the semi-trailer as shown in Fig. 2.

Fig. 6 is a sectional view of the trailer bed taken along the line 6—6 of Fig. 5 and showing the rear wheel and axle support assembly in elevation.

Referring to Figs. 1 and 2, it may be seen that our improved semi-trailer conforms in many respects to the usual type designed for the transportation of heavy equipment and machinery. It has a flat, uncovered, unenclosed bed 1, constructed of wooden planking 3 which is secured to and supported by a steel frame 5. The frame, generally designated 5, may be essentially conventional in construction, and includes side members 2 and intermediate longitudinal I-beam members 7 secured in position by several crossmembers formed of I-beams 9 and channels 11. The two longitudinally extending intermediate frame members 7 are longer than the rest of the trailer frame, however, and project rearwardly beyond the flooring 3 and rear crossmember 11 at 13 for engagement with two dual wheel and axle support assemblies, generally indicated at 15 (Fig. 3). At its front end the frame extends angularly upwardly and forwardly and is designed to overlie and to be coupled as by fifth wheel 16 to the rear end of a tractor truck.

Figs. 2, 4, 5, and 6 illustrate the construction of the two dual wheel and axle support assemblies 15 and the manner in which they are secured to the projecting I-beam portions 13. The two assemblies 15 are identical and each includes two wheels 17, carrying the customary tires 19. The two wheels are mounted on the opposite ends of an axle shaft 21. The axle shaft 21 is provided with flanged ends 23 disposed on the outer surfaces of each wheel and rigidly secured thereto so that axle and wheels rotate together. The axle extends through and rotates within a bearing block 25. As will be obvious to those skilled in the art, the assembly might be constructed with a non-rotatable axle and wheels adapted to rotate about the axle. The bearing block 25 is trunnioned between two upwardly extending yoke portions 27 of a hanger block 31 by means of a trunnion shaft 29 which extends through the bearing block 25 and through the yoke portions 27. The trunnion shaft 29 extends lengthwise of the trailer on a plane perpendicular to the axle shaft 21 so as to permit the bearing block 25 and axle shaft 21 to pivot laterally. Pins 33 extend through the trunnion shaft 29 on either side of the yoke portions 27 so as to retain the shaft 29 in position. The lower portion of the hanger blocks 31 provides a rectangular opening 34 extending lengthwise of the trailer, which is of sufficient size and shape to snugly house the I-beam 13. A flat horizontal flange 35 is rigid with and extends rearwardly from the hanger block 31. Both the flange 35 and the I-beam portion 13 are provided with apertures which are aligned when the assemblies 15 are in position, so that bolts 39 may be inserted through them in order to secure the dual wheel assembly on the I-beam portion 13. The bolts 39 are projected through the holes 40, in the I-beam top flange and into suitably tapped holes 42, in a horizontal plate 44 rigidly secured as by welding to the vertical web of the I-beam in a position spacedly below the top web thereof. This construction assures that the load will always be carried by both wheels of an assembly, as should the surface under an assembly be of uneven height, the bearing block 25 will rock laterally on the trunnion shaft 29 so that both wheels will bear on the travelling surface.

Two identical hydraulic jacks 41 are carried in inverted position by the frame, one on each side of the frame near the rear of the bed. Each jack includes a cylinder 47 rigidly attached to the frame, and preferably positioned below the floor level, a piston rod operable by a piston (not shown) within the cylinder, a piston rod 45 projectable downwardly from and retractable upwardly into the cylinder, and a ground-engaging shoe 43 attached to the lower end of the rod. The parts are so proportioned that when the rod and shoe are forced all the way down, the trailer frame, including the projecting I-beam portions 13, is lifted, while of course when retracted, the shoes are raised clear of the ground. The fluid to power the jacks 41 is carried through hoses 49, which extend to the front of the trailer and are adapted to be coupled with a fluid reservoir 51 and compressor 53 carried by the truck which hauls the trailer. Fluid regulating controls 55 are interconnected with the fluid system and are provided with levers 57 for the individual operation of each jack. These may take the form of valves through which the hydraulic fluid may be introduced into and exhausted from each cylinder at will and in a finely controlled manner. Accurate control is desirable for the reason that the operator usually wishes to lift each rear corner of the trailer just enough to free the beam portions 13 in the yoke holes 34, without, however, lifting so far as to cause the weight of the dual wheels to hang on such beam portions. We have found, however, that ordinary commercially available valves afford sufficient accuracy of control in this respect, and it is believed, therefore, that detailed description of the valving means will not be required. Removable or foldable extension handles may be provided for the valves. These are shown as simple tubular extensions having lower ends adapted to fit over the valve-operating levers for the more convenient manipulation of the valves. They may be removed when not needed and stored below the wooden flooring 3.

In order to load the trailer, the piston rod and foot portions 45, 43 of the jacks are extended so as to raise the frame in an upward direction just enough to remove the weight of the trailer from the opening 34. The bolts 39 are then removed so that the dual wheel assemblies can be withdrawn from the I-beam by rolling the tires backwards. This same operation is performed with both dual wheel assemblies. The piston rods 45 are then withdrawn so as to lower the trailer bed 1 to the ground. A vehicle or other heavy load may then be moved directly onto the trailer bed over the rear thereof from the ground. The jacks 41 are then operated so as to raise the trailer and the assemblies 15 may then be replaced in the same manner in which they were removed.

It should be noted that unevenness or inclination of the terrain presents no difficulty to this construction because of the individual operation of the jacks and the ability of the hanger blocks 31 to rock laterally on the trunnion shaft. The yokes may be speedily and conveniently lined up with the I-beams 13 and placed in position without having to lift the wheel assemblies off the ground. The wheel assemblies may be installed and removed by merely rolling the tires along the ground.

While it will be apparent that the preferred embodiment of the invention herein disclosed is well calculated to fulfill the objects and advantages above stated, it will be appreciated that the invention is susceptible to variation, modification and change without departing from the fair meaning and proper scope of the subjoined claims.

What is claimed is:

1. A trailer construction including a bed, a plurality of parallel cantilever beams extending longitudinally rearwardly of and rigid with respect to said bed, a dual wheel supporting assembly mounted on each of said rearwardly extending beams, each of said assemblies comprising a supporting member having a longitudinal passageway therethrough for the reception of and being slidably and removably overfitted upon one of said rearwardly extending beams, means for retaining each of said supporting members on said beam upon which it is overfitted, two longitudinally spaced upwardly extending arms fixedly mounted on each supporting member, a block member pivotally mounted between said supporting arms for rocking movement about a longitudinal axis, an axle mounted in said block member, and two wheels mounted on said axle on opposite sides of said block member.

2. A trailer construction including a bed, a plurality of parallel cantilever beams extending longitudinally rearwardly from and rigid with respect to said bed, a dual wheel supporting assembly mounted on each of said rearwardly extending beams, each of said assemblies comprising a supporting yoke having a longitudinal passageway therethrough for the reception of and being slidably and removably overfitted upon one of said rearwardly extending beams, releasable means for retaining each of said supporting members on said beam upon which it is overfitted, trunnion means carried by said yoke above said passageway, an axle supporting member carried by said trunnion means for rocking movement about an axis parallel to said passageway, and axle means extending perpendicularly to said axis and to said passageway and to said beams, said axle means being rockable as a unit with said supporting member and being adapted to support a wheel on each side of said yoke and of the beam upon which it is overfitted.

3. A trailer construction as defined in claim 2 including jack means carried by said bed, and a pad portion forming a part of said jack means and movable upwardly and downwardly between positions wherein said pad portion projects substantially below said bed and a position wherein the pad portion is retracted upwardly relatively closer to the bed.

4. A trailer construction as defined in claim 2 wherein said bed is substantially rectangular and including a pair of jack means carried by said bed, and one located near each side of and near the rear of said bed, a pad portion forming a part of each of said jack means and movable upwardly and downwardly between positions wherein said pad portion projects substantially below said bed and a position wherein the pad portion is retracted upwardly relatively closer to the bed, and separately controllable operating means for each of said jack means.

References Cited in the file of this patent

UNITED STATES PATENTS

| | | |
|---|---|---|
| 2,154,129 | Jones | Apr. 11, 1939 |
| 2,350,841 | Troche et al. | June 6, 1944 |
| 2,575,065 | Merry | Nov. 13, 1951 |
| 2,621,941 | Neumayr | Dec. 16, 1952 |